United States Patent [19]

Bertram et al.

[11] Patent Number: 4,946,817

[45] Date of Patent: Aug. 7, 1990

[54] LATENT CATALYSTS FOR EPOXY-CONTAINING COMPOUNDS

[75] Inventors: James L. Bertram, Lake Jackson; Louis L. Walker, Clute; Van I. W. Stuart, Missouri City, all of Tex.

[73] Assignee: The Dow Chemical Company, Midland, Mich.

[21] Appl. No.: 274,264

[22] Filed: Nov. 18, 1988

Related U.S. Application Data

[63] Continuation-in-part of Ser. No. 155,656, Feb. 12, 1988, abandoned, which is a continuation-in-part of Ser. No. 21,837, Mar. 4, 1987, Pat. No. 4,725,652, which is a continuation-in-part of Ser. No. 849,087, Apr. 7, 1986, abandoned, which is a continuation-in-part of Ser. No. 716,279, Mar. 25, 1985, Pat. No. 4,594,291, which is a continuation-in-part of Ser. No. 631,676, Jul. 17, 1984, abandoned.

[51] Int. Cl.$^5$ .................. B01J 31/12; B01J 31/02
[52] U.S. Cl. .................. 502/154; 502/152; 502/155; 502/164
[58] Field of Search ............... 502/152, 154, 155, 164, 502/167, 168

[56] References Cited

U.S. PATENT DOCUMENTS

| | | | |
|---|---|---|---|
| 3,048,552 | 8/1962 | Fang | 260/28.5 |
| 3,477,990 | 11/1969 | Dante et al. | 260/47 |
| 3,493,630 | 2/1970 | Salensky | 260/831 |
| 3,547,881 | 12/1970 | Mueller et al. | 260/47 |
| 3,565,861 | 2/1971 | White et al. | 260/47 |
| 3,687,894 | 9/1972 | Collings et al. | 260/47 EC |
| 3,694,407 | 9/1972 | Krikorian | 260/47 EP |
| 3,738,862 | 12/1973 | Klarquist et al. | 117/126 GE |
| 3,794,619 | 2/1974 | Hasegawa et al. | 260/47 EP |
| 3,947,395 | 3/1976 | Ogata et al. | 260/28 P |
| 3,948,855 | 4/1976 | Perry | 260/47 EP |
| 4,136,102 | 1/1979 | Crivello | 260/440 |
| 4,150,988 | 4/1979 | Crivello | 96/35.1 |
| 4,154,872 | 5/1979 | Tsao et al. | 427/44 |
| 4,173,476 | 11/1979 | Smith et al. | 430/280 |
| 4,175,972 | 11/1979 | Crivello | 204/159.18 |
| 4,273,668 | 6/1981 | Crivello | 252/182 |
| 4,318,766 | 3/1982 | Smith | 156/330 |
| 4,322,456 | 3/1982 | Martin | 427/195 |
| 4,343,731 | 8/1982 | Pucci et al. | 523/427 |
| 4,358,578 | 11/1982 | Brownscombe | 528/91 |
| 4,366,295 | 12/1982 | Tyler, Jr. et al. | 525/482 |
| 4,410,596 | 10/1983 | Whiteside, Jr. et al. | 428/413 |
| 4,438,254 | 3/1984 | Doorakian et al. | 528/89 |
| 4,440,014 | 4/1984 | Helfand et al. | 525/482 |
| 4,477,645 | 10/1984 | Doorakian et al. | 528/99 |
| 4,496,709 | 1/1985 | Doorakian et al. | 528/89 |
| 4,540,823 | 9/1985 | Doorakian et al. | 568/10 |
| 4,554,342 | 11/1985 | Corley | 528/90 |
| 4,581,436 | 4/1986 | Corley | 528/90 |
| 4,594,291 | 6/1986 | Bertram et al. | 428/414 |
| 4,692,504 | 9/1987 | Frank | 502/164 X |
| 4,775,734 | 10/1988 | Goel | 528/89 |

FOREIGN PATENT DOCUMENTS

| | | |
|---|---|---|
| 858648 | 12/1970 | Canada . |
| 893191 | 2/1972 | Canada . |
| 2624981 | 12/1976 | Fed. Rep. of Germany . |
| 58-138729 | 8/1983 | Japan . |
| 86-01216 | 2/1986 | PCT Int'l Appl. . |
| 963058 | 7/1964 | United Kingdom . |

OTHER PUBLICATIONS

"On the Thermal Behaviour of Some Alkylammonium Tetrafluoroborates", Zabinska, Ferloni and Sanesi, *Journ. Calorim., Anal. Therm. Thermodyn. Chim.*, vol. 17, pp. 250-253 (1986).
"Proposed Mechanism for the Curing of Epoxy Resins with Amine-Lewis Acid Complexes or Salts", J. J. Harris et al., *J. Ap. Pol. Sc.*, vol. 10, pp. 523-534 (1966).
*J. Org. Chem.*, vol. 49, pp. 1824-1825, 1984, by B. J. McBride, M. E. Garst and M. Hopkins.

*Primary Examiner*—Patrick P. Garvin

[57] ABSTRACT

Latent catalysts for epoxy reactions are prepared by reacting a tetrasubstituted onium compound such as tetrabutylphosphonium acetate acetic acid complex with an acid or metal salt of an acid having a weak-nucleophilic anion such as fluoboric acid. These catalysts provide stable latent catalysts for epoxy resins for advancement or curing reactions.

13 Claims, No Drawings

LATENT CATALYSTS FOR EPOXY-CONTAINING COMPOUNDS

CROSS REFERENCE TO RELATED APPLICATIONS

This application is a continuation-in-part of application Ser. No. 155,656 filed Feb. 12, 1988 (now abandoned), which is a continuation-in-part of application Ser. No. 021,837 filed Mar. 4, 1987 (now U.S. Pat. No. 4,725,652), which is a continuation-in-part of application Ser. No. 849,087 filed Apr. 7, 1986 (now abandoned), which is a continuation-in-part of application Ser. No. 716,279 filed Mar. 25, 1985, (now U.S. Pat. No. 4,594,291), which is a continuation-in-part of application Ser. No. 631,676, filed Jul. 17, 1984 (now abandoned), all of which are incorporated herein by reference.

BACKGROUND OF THE INVENTION

The present invention concerns new compositions of matter useful as latent catalysts for reacting epoxy resins with polyhydric phenols.

It is desirable to have epoxy resin compositions which contain catalysts which will not become active until heated so as to improve storage life. Tyler, Jr. et al in U.S. Pat. No. 4,366,295, Perry in U.S. Pat. No. 3,948,855 and Dante in U.S. Pat. No. 3,477,990 disclose precatalyzed epoxy resin compositions which contain onium compounds as the catalyst. While the epoxy resin compositions containing these catalysts are relatively storage stable, it would be desirable for the precatalyzed epoxy resin composition to be even more stable.

It has now been discovered that when an onium compound or amine compound has been contacted with an acid having a weak-nucleophilic anion that the storage stability of precatalyzed epoxy resins is improved.

SUMMARY OF THE INVENTION

The present invention pertains to new catalytic compositions which result from contacting (1) an onium compound represented by the following formulas IA or IB

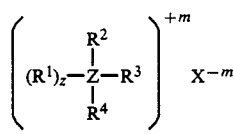  Formula IA.

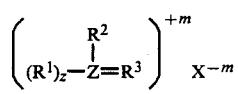  Formula IB.

wherein each $R^1$, $R^2$, $R^3$ and $R^4$ is independently an aliphatic hydrocarbyl group having from 1 to about 18, preferably from about 1 to about 9, carbon atoms, or a hydrocarbyl group having from 1 to about 18, preferably from 1 to about 9, carbon atoms which group also contains one or more oxygen, sulfur, halogen, or nitrogen atoms or two of such R, $R^1$, $R^2$ and $R^3$ groups can combine to form a heterocyclic ring containing one or more atoms other than carbon atoms; each X is the anion portion of an acid having a relatively-strong nucleophilic anion; Z is phosphorus, nitrogen, or arsenic; m has a value equal to the valence of the anion X; and z has a value of zero or 1 depending on the valence of Z; with (2) (a) an inorganic acid free of boron, said inorganic acid having a weak-nucleophilic anion, (b) a metal salt of an inorganic acid free of boron, said inorganic acid having a weak-nucleophilic anion, (c) an inorganic acid containing boron represented by the formula BR$_3$R′ wherein each R is independently hydrogen or an aliphatic, cycloaliphatic or aromatic hydrocarbyl group having from 1 to about 12 carbon atoms or a halogen and R′ is a group other than a hydrocarbyl group, (d) a metal salt of an inorganic acid containing boron represented by the formula BR$_3$R′ wherein each R is independently hydrogen or an aliphatic, cycloaliphatic or aromatic hydrocarbyl group having from 1 to about 12 carbon atoms or a halogen and R′ is a group other than a hydrocarbyl group, or (e) any combination of any two or more of components (a), (b), (c) or (d); wherein components (1) and (2) are contacted in quantities which provide from about 0.6 to about 1.4 moles of acid or acid salt per mole of onium compound.

Another aspect of the present invention pertains to new catalytic compositions represented by the Formulas IA or IB

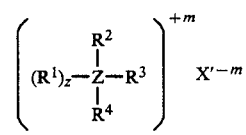  Formula IA.

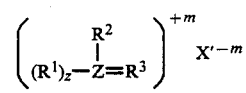  Formula IB.

wherein each $R^1$, $R^2$, $R^3$ and $R^4$ is independently an aliphatic group having from 1 to about 18, preferably from about 1 to about 9, carbon atoms, or a hydrocarbyl group having from 1 to about 18, preferably from 1 to about 9 carbon atoms which group also contains one or more oxygen, sulfur, halogen, or nitrogen atoms or two of such R, $R^1$, $R^2$ and $R^3$ groups can combine to form a heterocyclic ring containing one or more atoms other than carbon atoms; each X′ is the anion portion of a weak-nucleophilic acid; Z is phosphorus, nitrogen, or arsenic; m has a value equal to the valence of the anion X′; and z has a value of zero or 1 depending on the valence of Z.

Epoxy resin compositions containing these catalysts, when stored at a temperature of 52° C. for a period of nine weeks, exhibit an increase in viscosity measured in centipoise of not greater than about 22, preferably not greater than about 18, percent as compared to the viscosity of the composition prior to storing and wherein the viscosity measurements are taken at room temperature and which composition comprises a material that has an average of more than one vicinal epoxy group per molecule and a catalytic quantity of the catalyst.

The term hydrocarbyl as employed herein refers to a monovalent aliphatic hydrocarbon group such as alkyl, cycloalkyl, alkenyl and similar hydrocarbon groups.

The term weak-nucleophilic as employed herein means that the material has a necleophilicity value "n" from about zero to less than about 2.5 as described by C. G. Swain and C. B. Scott in J. Am. Chem. Soc., Vol. 75, p. 141 (1953) which is incorporated herein by reference.

The term relatively strong-nucleophilic as employed herein means that the material has a nucleophilicity value "n" of 2.5 or greater as described by C. G. Swain and C. B. Scott in J. Am. Chem. Soc., Vol. 75, p. 141 (1953) which is incorporated herein by reference.

DETAILED DESCRIPTION OF THE INVENTION

The catalysts of the present invention are prepared by simply mixing the onium compound or the amine compound with an inorganic acid or salt of an inorganic acid having a weak-nucleophilic anion in the desired proportions and stirring to insure intimate contact. The contact can be conducted at temperatures of from about 0° C. to about 100° C., preferably from about 20° C. to about 60° C. for a time sufficient to complete any reaction which occurs. The time depends upon the temperature, but usually from about 1 to about 120, preferably from about 5 to about 60 minutes is sufficient. Other methods for preparing the catalyst of the present invention is to employ an in situ method wherein the onium compound or the amine compound and the inorganic acid or salt of an inorganic acid, said acid containing a weak-nucleophilic anion are added separately to the resin formulation or component parts thereof thereby forming the catalyst in situ.

Particularly suitable onium or amine compounds which can be reacted or complexed with the inorganic acids having a weak-nucleophilic anion to form the catalysts of the present invention include, for example, tetrabutylphosphonium acetate•acetic acid complex, tetrabutylphosphonium hydroxide, tetrabutylammonium hydroxide, tetraethylammonium hydroxide, tetramethylammonium hydroxide, tetrabutylphosphonium chloride, tetrabutylammonium chloride, tetraethylammonium chloride, tetramethylammonium chloride, triethylamine hydrochloride, 2-methylimidazole hydrochloride, N-methylmorpholine hydrochloride, ethyltri(2-hydroxyethyl)ammonium chloride, triethyl(2-thioethylethyl)ammonium chloride, N-methylmorpholine, 2-methylimidazole, triethylamine, N,N,N',N'-tetramethylethylenediamine, ethyltri(2-hydroxyethyl)-ammonium hydroxide, ethyltri(2-ethoxyethyl)ammonium hydroxide, triethyl(2-thioethylethyl)ammonium hydroxide, mixtures thereof and the like.

Particularly suitable onium or amine-acid complexes which can be reacted with the salt of inorganic acids having a weak-nucleophilic anion to form the catalysts of the present invention include, for example, tetrabutylphosphonium chloride, tetrabutylammonium chloride, tetraethylammonium chloride, tetramethylammonium chloride, triethylamine hydrochloride, 2-methylimidazole hydrochloride, N-methylmorpholine hydrochloride, ethyltri(2-hydroxyethyl)ammonium chloride, triethyl(2-thioethylethyl)ammonium chloride, mixtures thereof and the like.

Suitable boron containing acids include, for example, those represented by the formula $BR_3R'$ wherein each R is independently hydrogen or an aliphatic, cycloaliphatic or aromatic hydrocarbon or substituted hydrocarbon group having suitably from 1 to about 12, more suitably from about 1 to about 6, most suitably from about 1 to about 4, carbon atoms; and R' is a group other than a hydrocarbyl group such as, for example, a hydrocarbonoxy, hydrocarbonamino, a hydrocarbonphosphino, or a halogen atom, particularly fluorine, chlorine or bromine. The term hydrocarbon means any aliphatic, cycloaliphatic, aromatic, arylsubstituted aliphatic, alkyl substituted aromatic groups.

Suitable such acids containing boron include, for example, hydrogen fluorotriphenylborate, hydrogen chlorotriphenylborate,, hydrogen fluorotributylborate, hydrogen phenyltrifluoborate. Most particularly suitable such acid is fluoboric acid.

Fluoboric acid is sometimes referred to as fluoroboric acid or hydrogen tetrafluoroborate. Any of these expressions refer to the chemical represented by the formula $HBF_4$.

The term hydrocarbonoxy means that a hydrocarbyl group as previously defined has an oxygen atom between it and the boron atom. Likewise, the term hydrocarbonamino and hydrocarbonphosphino mean that there is an amine or phosphine group between the hydrocarbyl group and the boron atom.

Particularly suitable inorganic acids which are free of boron, said acid having a weak nucleophilic anion include, for example, fluoarsenic acid, fluoantimonic acid, fluophosphoric acid, chloroboric acid, chloroarsenic acid, chloroantimonic acid, chlorophosphoric acid, perchloric acid, chloric acid, bromic acid, iodic acid and or any combination thereof and the like.

Suitable metal salts of the aforementioned boron-free or boron containing inorganic acids having a weak nucleophilic anion include, for example, salts of the metals of Groups I and II of the Periodic Table of the Elements published by Sargent-Welch Scientific Company as catalog number S-18806. Particularly such salts include, for example, the sodium, potassium, lithium, calcium, barium magnesium and silver salts of such inorganic acids.

Suitable relatively strong-nucleophilic acid anions include, for example, carboxylates, halides, phosphates, phosphites, carbonates, bicarbonates, hydroxide, cyanide, thiol, sulfate, thiosulfate, and the like. Particularly suitable such nucleophilic acid anions include, for example, acetate, acetate•acetic acid complex, propionate, chloride, iodide, and the like.

The resultant catalyst is believed to be a material represented by the aforementioned formulas IA and IB wherein X' is the anion portion of an inorganic acid having a weak nucleophilic anion or a combination of such acids.

Suitable epoxy resins with which the catalysts of the present invention can be mixed include, for example, those represented by the following formulas II-V

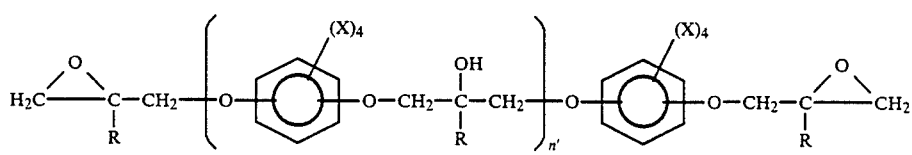

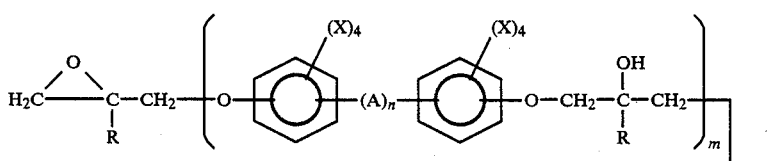

III.

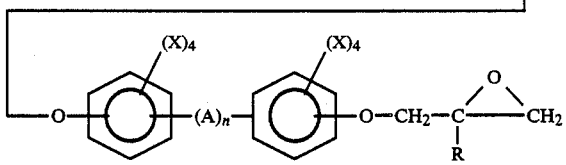

IV.

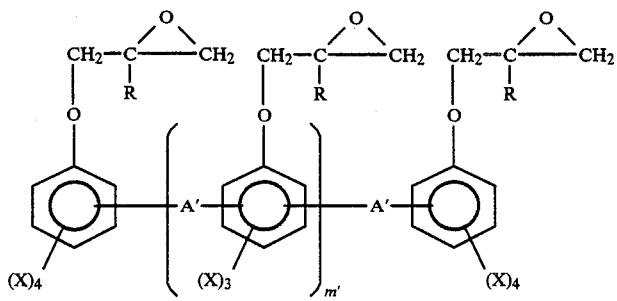

V.

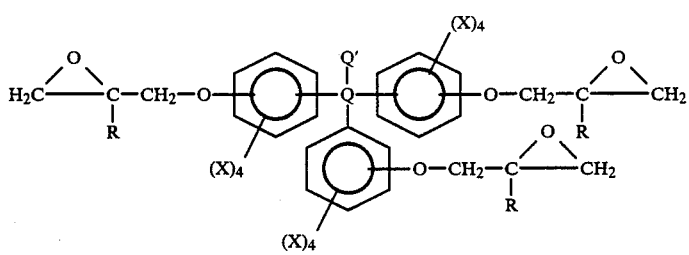

wherein each A is independently a divalent hydrocarbyl group having from 1 to about 9, preferably from 1 to about 4, carbon atoms, —O—, —S—, —S—S—, —SO—, —SO$_2$—, or —CO—; each A' is independently a divalent hydrocarbyl group having from 1 to about 9, preferably from 1 to about 4 carbon atoms; Q is a hydrocarbyl group having from 1 to about 10 carbon atoms; Q' is hydrogen or an alkyl group having from 1 to about 4 carbon atoms; each R is independently hydrogen or an alkyl group having from 1 to about 4 carbon atoms; each X is independently hydrogen, bromine, chlorine, or a hydrocarbyl group having from 1 to about 9, preferably from 1 to about 4 carbon atoms; m has an average value from zero to about 12, preferably from about 0.03 to about 9, most preferably from about 0.03 to about 3; m' has a value from about 0.01 to about 10, preferably from about 0.2 to about 8, more preferably from about 0.5 to about 6; n has a value of zero or 1; and n' has an average value of from zero to about 10, preferably from zero to about 5, most preferably from about 0.1 to about 3.

Particularly suitable such epoxy resins include, for example, the diglycidyl ethers of resorcinol, catechol, hydroquinone, biphenol, bisphenol A, tetrabromobisphenol A, phenol-aldehyde novolac resins, alkyl substituted phenol-aldehyde resins, bisphenol K, tetramethylbiphenol, tetramethyltetrabromobiphenol, tetramethyltribromobiphenol, tetrachlorobisphenol A, combinations thereof and the like.

Also suitable as the epoxy resin to which the catalysts of the present invention can be mixed include those partially advanced expoxy resins of allowed copending application Ser. No. 716,279, filed Mar. 25, 1985 by Bertram et al which is incorporated herein by reference.

Suitable aromatic hydroxyl containing materials which can be employed herein include, for example, those represented by the following formulas VI–IX

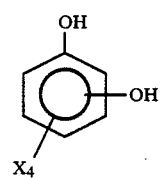

VI.

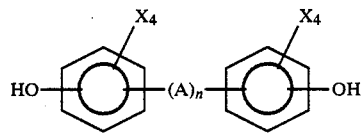

VII.

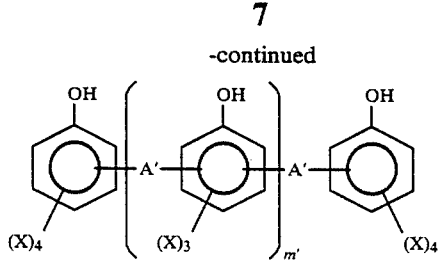

VIII.

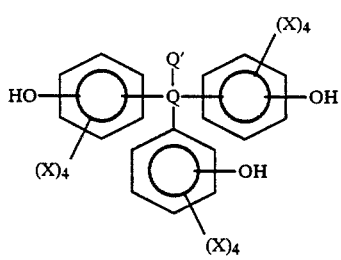

IX.

wherein A, A', Q, Q', X, n and m are as defined above in formulas II–V. Particularly suitable aromatic hydroxyl-containing materials include, for example, biphenol, bisphenol A, bisphenol K, tetrabromobisphenol A, tetrabromobisphenol K, resorcinol, phenol-aldehyde novolac resins, cresol-aldehyde novolac resins, tetramethylbiphenol, tetramethyltribromobiphenol, tetramethyltetrabromobiphenol, tetrachorobisphenol. A, combinations thereof and the like.

These and other suitable aromatic hydroxylcontaining materials are disclosed in U.S. Pat. No. 4,594,291 issued Jun. 10, 1986 by Bertra et al which is incorporated herein by reference.

The precatalyzed compositions of the present invention can contain, if desired, pigments, fillers, dyes, diluents, solvents, stabilizers, epoxy resin curing agents, combinations thereof and the like.

Suitable stabilizer materials and curing agents which can be employed herein include, for example, those disclosed in the aforementioned U.S. Pat. No. 4,594,291 by Bertram et al which is incorporated herein by reference.

The following examples are illustrative of the invention but are not to be construed as to limiting the scope thereof in any manner.

EPOXY RESIN A was a diglycidyl ether of bisphenol A having an epoxide equivalent weight of 180.8.

EXTENDER COMPOUND A was tetrabromobisphenol A having a phenolic hydroxyl equivalent weight (PHEW) of 272.

CURING AGENT A was sulfanilamide having an active hydrogen equivalent weight of about 43.

CURING AGENT B was 4,4'-diaminodiphenylsulfone having an amine hydrogen equivalent weight of about 62.

STABILIZER A was methyl-p-toluene sulfonate.

STABILIZER B was p-tolouene sulfonic acid•monohydrate.

EXAMPLES 1–21 AND COMPARATIVE EXPERIMENTS A-Z

CATALYST PREPARATION

The catalysts employed in the present invention were prepared by the following general procedure. To a methanol solution of the onium or amine compound was added a 60 percent aqueous solution of fluoboric acid. A sufficient quantity of methanol was added such that the resultant product contained 40 percent of the onium or amine compound by weight. Stirring was continued until the reaction was essentially complete. The quantities and reaction conditions are given in the following Table I.

TABLE I

| CATALYST NUMBER | TYPE OF ONIUM OR AMINE COMPOUND | AMOUNT GRAMS/MOLES | AMOUNT OF FLUOBORIC ACID GRAMS/MOLES |
| --- | --- | --- | --- |
| 1* | 70 wt. % ethyltriphenylphonium acetate · acetic acid complex in methanol | 58.6/0.1 | 17.56/0.12 |
| 2 | 70 wt. % tetrabutylphosphonium acetate · acetic acid complex in methanol | 54/0.1 | 17.56/0.12 |
| 3 | triethylamine | 101/1.0 | 201.2/1.1 |
| 4 | N-methylmorpholine | 10.1/0.1 | 17.56/1.1 |
| 5 | N,N,N',N'-tetramethyl ethylene diamine | 58.0/0.1 | 201.2/1.1 |

*Comparative catalyst.

COMPARATIVE CATALYSTS

For comparative purposes, the following catalysts were utilized.

Catalyst A was ethyltriphenylphosphonium acetate•acetic acid complex.

Catalyst B was tetrabutylphosphonium acetate•acetic acid complex.

Catalyst C was ethyltriphenylphosphonium acetate•acetic acid complex plus an equimolar amount of phosphoric acid as described by Tyler, Jr. in U.S. Pat. No. 4,366,295.

Catalyst D was tetrabutylphosphonium acetate•acetic acid complex plus an equimolar amount of phosphoric acid as described by Tyler, Jr. in U.S. Pat. No. 4,366,295.

Catalyst E was 2-methylimidazole.

Catalyst F was benzyl dimethyl amine.

Catalyst G was ethyltriphenylphosphonium iodide, 30 percent active.

PRECATALYZED EPOXY RESIN FORMULATION A

Precatalyzed epoxy resins were prepared by adding to 120 grams (0.638 equiv.) of a diglycidyl ether of bisphenol A having an epoxide equivalent weight of 188 (commercially available from the Dow Chemical Company as D.E.R. TM 331 epoxy resin) 0.45 milliequivalent of catalyst and stirring. The precatalyzed resins were placed in a vacuum oven under a full vacuum (approximately 0.1 mm Hg) controlled at 50° C. to 55° C. for one hour (3600 s). The samples were then stored in a convection oven controlled at 52° C. and the viscosity of the samples were measured at periodic intervals. The samples were allowed to cool for 4 hours (14400 s) at room temperature before measuring the viscosity. The results are given in the following Table II.

TABLE II

VISCOSITY OF PRECATALYZED EPOXY RESIN (13.599)

| Example or COMP. EXPT. NO. | CATALYST | INITIAL centipoise (Pa.s) | 1 WEEK (604800 s) centipoise (Pa.s) | 2 WEEKS (1209600 s) centipoise (Pa.s) | 4 WEEKS (2149200 s) centipoise (Pa.s) | 9 WEEKS (5443200 s) centipoise (Pa.s) |
|---|---|---|---|---|---|---|
| 1* | 1 | 12500 (12.5) | 11768 (11.768) | 11538 (11.538) | 14504 (14.504) | 15007 (15.007) |
| 2 | 2 | 12500 (12.5) | 12544 (12.544) | 12397 (12.397) | 13564 (13.564) | 14732 (14.732) |
| 3 | 3 | 12500 (12.5) | 12819 (12.819) | 12225 (12.225) | 13599 (12.599) | 14732 (14.732) |
| 4 | 4 | 12500 (12.5) | 13736 (13.736) | 12809 (12.809) | 14731 (14.731) | 15247 (15.247) |
| A* | No Catalyst | 12500 (12.5) | 12500 (12.5) | 12362 (12.362) | 14491 (14.491) | 15590 (15.59) |
| B* | A | 12500 (12.5) | 20020 (20.02) | 28502 (28.502) | 70603 (70.603) | 198485 (198.485) |
| C* | C | 12500 (12.5) | 12397 (12.397) | 12843 (12.843) | 14216 (14.216) | 19059 (19.059) |
| D* | D | 12500 (12.5) | 12225 (12.225) | 12156 (12.156) | 13323 (13.323) | 15075 (15.075) |

*Not an example of this invention as presently claimed.

RESIN ADVANCEMENT A

A portion of each of the precatalyzed resins from Table II, after aging for 9 weeks (5,443,200 s) at 52° C., were mixed with 22.5 weight percent bisphenol A at 160° C. until all of the bisphenol A had dissolved. The homogeneous solutions were then held at 160° C. for two additional hours, then cooled and the resultant advanced resins analyzed for percent oxirane (epoxide) content and melt viscosity measured at 150° C. The results are given in Table III.

TABLE III

ADVANCED RESIN ANALYSIS

| EXAMPLE OR COMP. EXPT. | RESIN FROM EXAMPLE OR COMP. EXPT. | PERCENT EPOXIDE** | MELT VISCOSITY CENTIPOISE (Pa.s) |
|---|---|---|---|
| 5* | 1 | 8.59 | 570 (0.57) |
| 6 | 2 | 8.66 | 550 (0.55) |
| 7 | 3 | 9.04 | 450 (0.45) |
| 8 | 4 | 9.66 | 260 (0.26) |
| E* | A*** | 8.9 | — |
| F* | B | 7.35 | 2760 (2.76) |
| G* | C | 8.44 | 680 (0.68) |
| H* | D | 8.70 | 520 (0.52) |

*Not an example of this invention as presently claimed.
**The theoretical percent epoxide is 9.0.
***Since this resin solution did not contain any advancement catalyst, 0.45 milliequiv. of catalyst A was employed.

RESIN ADVANCEMENT B

The procedure of Resin Advancement A was followed using 33.48 weight percent of bisphenol A instead of 22.5 weight percent. The resin/bisphenol A blends were held for 4 hours (14400 s) at 160° C. and then analyzed for oxirane content and melt viscosity measured at 200° C. The results are given in Table IV.

TABLE IV

ADVANCED EPOXY RESIN ANALYSIS

| EXAMPLE OR COMP. EXPT. | RESIN FROM EXAMPLE OR COMP. EXPT. | PERCENT EPOXIDE** | MELT VISCOSITY CENTIPOISE (Pa.s) |
|---|---|---|---|
| 9* | 1 | 1.82 | 26950 (26.95) |
| 10 | 2 | 1.85 | 30180 (30.18) |
| 11 | 3 | 3.1 | 890 (0.89) |
| 12 | 4 | 4.28 | 510 (0.51) |
| I* | A | 2.24 | 7940 (7.94) |
| J* | B | gelled | gelled |
| K* | C | 1.92 | 11470 (11.47) |
| L* | D | 2.10 | 7160 (7.16) |

*Not an example of this invention as presently claimed.
**The theoretical percent epoxide is 2.38.

PRECATALYZED RESIN FORMULATION B

To 181 grams (1 equiv.) of the diglycidyl ether of bisphenol A having an epoxide equivalen weight of 181 (commercially available from The Dow Chemical Company as D.E.R. TM 383 epoxy resin) was added 136 grams (0.5 equiv.) of tetrabromobisphenol A and an indicated amount of catalyst. In two of the examples or comparative experiments 1 or 1.125 milliequiv. of methyl toluene sulfonate (MTS) was added as indicated. The mixture was stirred at 130° C. until the tetrabromobisphenol A was dissolved, then cooled to 80° C. and the indicated catalyst was added. The homogeneous resin was then stored at 52° C. and the viscosity measured at 100° C. was measured periodically. The results are given in Table V.

TABLE V

| EXAMPLE OR COMP. EXPT. | CATALYST TYPE | RESIN VISCOSITY CATALYST milliequiv. | MTS milliequiv. | MELT VISCOSITY AFTER 12 DAYS (1036800 s) cps (Pa.s) |
|---|---|---|---|---|
| 13* | 2 | 1 | 0 | 90 (0.09) |
| 14 | 2 | 2 | 1 | 90 (0.09) |
| 15 | 2 | 2 | 1.25 | 110 (0. |
| 16 | 5 | 1 | 0 | 90 (0.09) |
| M* | none | — | 0 | 150 (0.15) |
| N* | none | — | 1 | 95 (0.095) |
| O* | A | 0.125 | 1.125 | 1240 (1.24) |

*Not an example of the present invention as presently claimed.

PRECATALYZED RESIN FORMULATION C

The procedure of precatalyzed resin formulation B was employed except that 0.125 milliequiv. of sulfanilamide was added along with the tetrabromobisphenol A, and the mixture was stirred and heated to 150° C. until homogeneous, then cooled to 80° C. and the following amounts of catalyst as indicated was added. The homogeneous resin was then stored at 52° C. and the viscosity measured at 100° C. was measured periodically. The results are given in Table VI.

TABLE VI

| EXAMPLE OR COMP. EXPT. | CATALYST TYPE | RESIN VISCOSITY CATALYST milliequiv | SULFANILAMIDE milliequiv | MELT VISCOSITY AFTER 12 DAYS (1036800 s) cps (Pa.s) |
|---|---|---|---|---|
| 17 | 2 | 1 | 0.125 | 450 (0.45) |
| 18 | 5 | 1 | 0.125 | 220 (0.22) |
| P* | none | — | 0.125 | 590 (0.59) |

*Not an example of the present invention.

PRECATALYZED RESIN FORMULATION D

To 45.3 grams (0.25 equiv) of D.E.R. ™ 383 epoxy resin as described above, 34 grams (0.125 equiv.) of tetrabromobisphenol A and 5.37 grams (0.125 equiv.) of sulfanilamide were added 1 milliequiv. of the indicated catalyst. A small amount of the resin mixture was then analyzed by a DuPont model 1090 Differential Scanning Calorimeter (DSC) at a rate of 2° C. per minute (0.033° C./s). The temperature at which an exothermic reaction was indicated via baseline, drift, the actual onset of a major exotherm, and the exotherm peak were noted. The results are given in Table VII.

TABLE VII

| EXAMPLE OR COMP. EXPT. | CATALYST TYPE | DSC DATA BEGINNING OF EXOTHERM °C. | ONSET OF MAJOR EXOTHERM °C. | PEAK EXOTHERM °C. |
|---|---|---|---|---|
| 19 | 2 | 80–85 | 145 | 192 |
| Q* | B | 65 | 70 | 148 |
| R* | none | 80–85 | 80–85 | 222 |

*Not an example of the present invention.

PRECATALYZED RESIN FORMULATION E

The Resin Formulations D were duplicated. The formulations were stored at 80° C. and the viscosity at 100° C. was measured periodically. The results are given in the following Table VIII.

TABLE VIII

| EXAMPLE OR COMP. EXPT. | CATALYST TYPE | INITIAL VISCOSITY cps (Pa.s) | FORMULATED VISCOSITY STABILITY VISCOSITY AFTER 12 hrs. (43200 s) cps (Pa.s) | 36 hrs. (129600 s) cps (Pa.s) |
|---|---|---|---|---|
| 20 | 2 | 287 (0.287) | 3594 (3.594) | 154140 (154.14) |
| S* | B | 287 (0.287) | >1000000 (1000) | — |
| T* | none | 287 (0.287) | 2209 (2.209) | 18599 (18.599) |

*Not an example of the present invention.

PREPARATION OF CURED COMPOSITION

A portion of the precatalyzed Resin Formulations form Table VIII was heated at 177° C. for 4 hours (14400 s) to cure the samples. The glass transition temperature (Tg) of the cured resins was determined by a DuPont model 1090 Differential Scanning Calorimeter (DSC). The results are given in Table IX.

TABLE IX

GLASS TRANSITION TEMPERATURE OF CURED RESINS

| EXAMPLE OR COMP. EXPT. | CATALYST TYPE | Tg, °C. |
|---|---|---|
| 20 | 2 | 135.4 |
| S* | B | 137.8 |
| T* | none | 111.2 |

*Not an example of the present invention.

EXAMPLE 22

Epoxy Resin A, 180.8 grams (1.0 equiv.), Extender Compound A, 136.0 grams (0.50 equiv) and 4.3 grams (0.1 equiv.) of curing agent A were heated with stirring under a nitrogen atmosphere at 120° C. until the melt viscosity measured at 100° C. had increased from about 80 cps to 200 cps, an increase in melt viscosity of 150 percent. Then 0.19 ml of Stabilizer A was added. After 5 minutes (300 s) stirring, the homogeneous mixture was cooled to 70° C., 2.16 ml of Catalyst 2 added and the resin cooled to ambient temperature.

EXAMPLE 23

A portion (714.8 grams) of the resin from Example 22 was mixed at 130° C. with 47.0 grams (0.76 equiv.) of Curing Agent B until homogeneous, then cured for 4 hours (14400 s) at 150° C. followed by 3 hours (10800 s) at 200° C. The cured casting has a glass transition temperature of 134.9° C. and a GIC value of 0.61 kj/m².

EXAMPLE 24

Epoxy Resin A (1012.5 grams, 5.6 equiv.), 761.6 grams (2.8 equiv.) of Extender A and 24.08 grams (0.56 equiv.) of Curing Agent A were heated with stirring under a nitrogen atmosphere at 120° C. until the melt viscosity measured at 100° C. had increased from about 80 cps to 200 cps, an increase in melt viscosity of 150 percent. Then 1.06 grams (5.6 milliequiv.) of Stabilizer B was added. After 5 minutes (300 s) at 120° C., the homogeneous mixture was cooled to 70° C., 12.1 ml (11.2 milliequiv.) of catalyst 2 added and the resin cooled to ambient temperature.

EXAMPLE 25

A portion (731.9 grams) of the resin from Example 24 was mixed at 130° C. with 48.06 grams (0.78 equiv.) of Curing Agent B until homogeneous, then cured for 4 hours (14400 s) at 150° C. followed by 3 hours (10800 s) at 200° C. The cured casting had a glass transition temperature of 137.3° C. and a GIC value of 0.72 kj/m².

What is claimed is:

1. A composition which results from contacting (1) an onium compound represented by the following formulas IA or IB

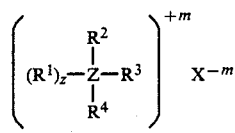

Formula IA.

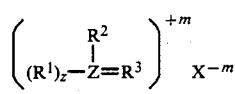

Formula IB.

wherein each $R^1$, $R^2$, $R^3$ and $R^4$ is independently an aliphatic hydrocarbyl group having from 1 to about 18 carbon atoms or an aliphatic group having from 1 to about 18 carbon atoms which group also contains one or more oxygen, sulfur, halogen or nitrogen atoms; each X is the anion portion of a relatively strong-nucleophilic acid; Z is arsenic; m has a value equal to the valence of the anion X; z has a value of zero or 1 depending on the valence of Z; and with (2) (a) an inorganic acid free of boron, said inorganic acid having a weak-nucleophilic anion, (b) a Group I or II metal salt of an inorganic acid free of boron, said inorganic acid having a weak-nucleophilic anion, (c) an acid containing boron represented by the formula $BR_3R'$ wherein each R is independently hydrogen or an aliphatic, cycloaliphatic or aromatic hydrocarbyl group having from 1 to about 12 carbon atoms or a halogen and R' is an inert non-nucleophilic group other than a hydrocarbyl group, (d) a Group I or II metal salt of an acid containing boron represented by the formula $BR_3R'$ wherein each R is independently hydrogen or an aliphatic, cycloaliphatic or aromatic hydrocarbyl group having from 1 to about 12 carbon atoms or a halogen and R' is an inert non-nucleophilic group other than a hydrocarbyl group, or (e) any combination of any two or more of components (a), (b), (c) or (d); wherein components (1) and (2) are contacted in quantities which provide from about 0.6 to about 1.4 moles of acid per mole of onium compound.

2. A composition of claim 1 wherein each $R^1$, $R^2$, $R^3$ and $R^4$ is independently an aliphatic hydrocarbyl group having from 1 to about 9 carbon atoms and components (1) and (2) are employed in quantities which provide from about 0.95 to about 1.15 moles of acid or acid salt per mole of component (1).

3. A composition of claim 2 wherein component (2) is fluoboric acid, fluoarsenic acid, fluoantimonic acid, fluophosphoric acid, chloroboric acid, chloroarsenic acid, chloroantimonic acid, chloro-phosphoric acid, perchloric acid, chloric acid, bromic acid, iodic acid, Group I or Group II metal salt of such acids, or any combination thereof; and components (1) and (2) are employed in quantities which provide from about 1.0 to about 1.15 moles of acid or acid salt per mole of component (1).

4. A composition of claim 3 wherein component (2) is fluoboric acid.

5. A composition represented by the Formulas IA or IB

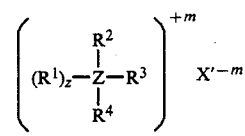

Formula IA.

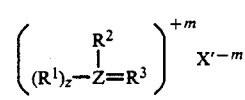

Formula IB.

wherein each $R^1$, $R^2$, $R^3$ and $R^4$ is independently an aliphatic group having from 1 to about 18 carbon atoms, or a hydrocarbyl group having from 1 to about 18 carbon atoms which group also contains one or more oxygen, sulfur, halogen, or nitrogen atoms or two of such R, $R^1$, $R^2$ and $R^3$ groups can combine to form a heterocyclic ring containing one or more atoms other than carbon atoms; each X' is the anion portion of a weak nucleophilic acid; Z is arsenic; m has a value equal to the valence of the anion X'; and z has a value of zero or 1 depending on the valence of Z.

6. A composition of claim 5 wherein each R¹, R², R³ and R⁴ is independently an aliphatic hydrocarbyl group having from 1 to about 9 carbon atoms and X' is fluorotriphenylborate, chlorotriphenylborate, fluorotributylborate, phenyltrifluoborate or tetrafluoborate.

7. A composition which results from contacting (1) an onium compound represented by the following formula

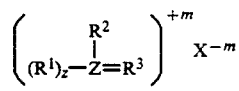

wherein each R¹, R², R³ and R⁴ is independently an aliphatic hydrocarbyl group having from 1 to about 18 carbon atoms or an aliphatic group having from 1 to about 18 carbon atoms which group also contains one or more oxygen, sulfur, halogen or nitrogen atoms; each X is the anion portion of a relatively strong-nucleophilic acid; Z is phosphorus, nitrogen, or arsenic; m has a value equal to the valence of the anion X; z has a value of zero or 1 depending on the valence of Z; and with (2) (a) an inorganic acid free of boron, said inorganic acid having a weak-nucleophilic anion, (b) a Group I or II metal salt of an inorganic acid free of boron, said inorganic acid having a weak-nucleophilic anion, (c) an acid containing boron represented by the formula BR₃R' wherein each R is independently hydrogen or an aliphatic, cycloaliphatic or aromatic hydrocarbyl group having from 1 to about 12 carbon atoms or a halogen and R' is an inert non-nucleophilic group other than a hydrocarbyl group, (d) a Group I or II metal salt of an acid containing boron represented by the formula BR₃R' wherein each R is independently hydrogen or an aliphatic, cycloaliphatic or aromatic hydrocarbyl group having from 1 to about 12 carbon atoms or a halogen and R' is an inert non-nucleophilic group other than a hydrocarbyl group, or (e) any combination of any two or more components (a), (b), (c) or (d); wherein components (1) and (2) are connected in quantities which provide from about 0.6 to about 1.4 moles of acid per mole of onium compound.

8. A composition of claim 7 wherein each R¹, R², R³ and R⁴ is independently an aliphatic hydrocarbyl group having from 1 to about 9 carbon atoms and Z is phosphorus or nitrogen; and components (1) and (2) are employed in quantities which provide from about 0.95 to about 1.15 moles of acid or acid salt per mole of component (1).

9. A composition of claim 8 wherein component (1-a) is a phosphonium compound; component (2) is fluoboric acid, fluoarsenic acid, fluoantimonic acid, fluophosphoric acid, chloroboric acid, chloroarsenic acid, chloroantimonic acid, chloro-phosphoric acid, perchloric acid, chloric acid, bromic acid, iodic acid, Group I or Group II metal salt of such acids, or any combination thereof; and components (1) and (2) are employed in quantities which provide from about 1.0 to about 1.15 moles of acid or acid salt per mole of component (1).

10. A composition of claim 9 wherein component (1) is tetrabutylphosphonium acetate·acetic acid comple, triethyl amine, 2-methylimidazole, N-methylmorpholine, N,N,N',N'-tetramethylethylenediamine or a combination thereof; and component (2) is fluoboric acid.

11. A composition represented by the Formula

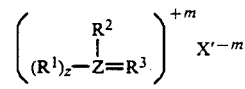

wherein each R¹, R², R³ and R⁴ is independently an aliphatic group having from 1 to about 18 carbon atoms, or a hydrocarbyl group having from 1 to about 18 carbon atoms which group also contains one or more oxygen, sulfur, halogen, or nitrogen atoms or two of such R, R¹, R² and R³ groups can combine to form a heteroicyclic ring containing one or more atoms other than carbon atoms; each X' is the anion portion of a nucleophilic acid; Z is phosphorus, nitrogen, or arsenic; m has a value equal to the valence of the anion X'; and z has a value of zero or 1 depending on the valence of Z.

12. A composition of claim 11 wherein each R¹, R², R³ and R⁴ is independently an aliphatic hydrocarbyl group having from 1 to about 9 carbon atoms and Z is phosphorus or nitrogen; and X' is fluorotriphenylborate, chlorotriphenylborate, fluorotributylborate, phenyltrifluoborate or tetrafluoborate.

13. A composition of claim 12 wherein Z is phosphorus; and X' is tetrafluoborate.

* * * * *